Figure 1:
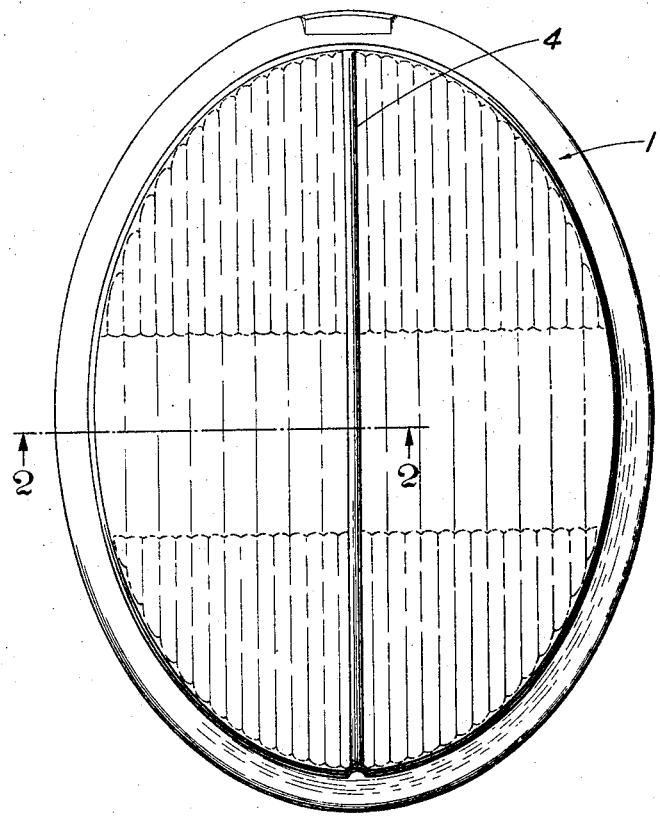

March 7, 1933.  J. R. HUGHES  1,899,964
HEAD LAMP LENS
Filed Nov. 17, 1930

INVENTOR.
James R Hughes
BY
ATTORNEY.

Patented Mar. 7, 1933

1,899,964

UNITED STATES PATENT OFFICE

JAMES R. HUGHES, OF SOUTH BEND, INDIANA, ASSIGNOR TO THE STUDEBAKER CORPORATION, OF SOUTH BEND, INDIANA, A CORPORATION OF NEW JERSEY

HEAD LAMP LENS

Application filed November 17, 1930. Serial No. 496,182.

This invention relates to a closure or lens adapted for use in automobile headlamps and lamps of a similar nature.

An object of this invention resides in a lens structure having a novel and pleasing ornamental effect.

A more specific object of the invention relates to the formation of closures or lenses of the type usually associated with automobile lights, in which a part of the front face of the lens comprises a surface which is much more highly reflective than the glass of which the lens is formed.

It is a further object of the invention to form lenses of this type with a strip or strips disposed across the body of the lens, said strips being provided with a highly polished reflecting surface having a metallic lustre and arranged to give a novel artistic effect to the lens.

A further object of the invention pertains to the provision of narrow highly polished metallic surfaces or strips disposed vertically of a lens body.

Another object of the invention comprises disposing such metallic strip or strips over the body of the lens so as to impart a pleasing effect thereto, the metallic strip or strips acting as a reinforcing means for the lens.

Other objects of the invention will become apparent from the detail description of the invention.

Figure 4:
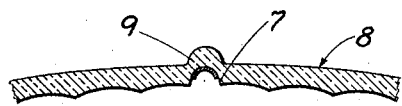
Figure 2:
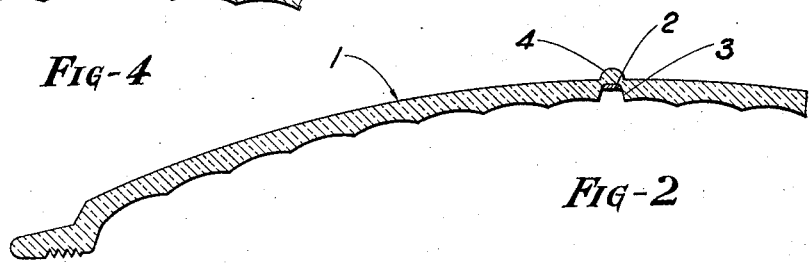
Figure 3:
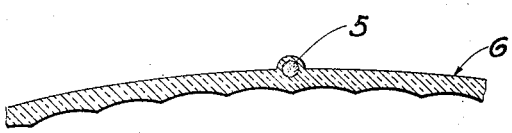

Referring to the drawing, which offers an illustration of the form which the invention may take:

Fig. 1 is a front elevation of a lens incorporating the subject matter of the invention, Fig. 2 is a fragmentary view of the lens of Fig. 1 taken along section line 2—2 of Fig. 1, Fig. 3 illustrates a modification of the invention taken along a section similar to that illustrated in Fig. 2, and Fig. 4 represents another modification taken along a section similar to that illustrated in Fig. 2.

The conventional lens construction utilized in automobile lamps offers very little in the way of ornamentation. In accord with the present trend in the automobile art, which leans toward the development of beauty in automobile body construction, I have found that the ornamentation of headlamp lenses and the lenses of the other automobile lamps forming accessories to car bodies, adds considerably to the artistic effect and ornamental appearance of motor cars. In accordance with my invention, I have provided lenses of this type with narrow surfaces disposed over the body of the lens and having a polish which reflects light to a considerably greater degree than the glass of the lens. The reflection of sunlight or other light by these surfaces contributes greatly to the external appearance of an automobile.

The manner in which these ornamental surfaces or strips may be provided may vary as to the exact form and character of the strip but any such variations are considered to be within the scope of the invention.

Referring to the drawing, I have shown in Fig. 1 a conventional form of closure or lens 1, elliptical in shape, and formed at its outer edge to fit a suitable headlamp frame. The particular form of the lens is immaterial, and the invention may be applied to lenses of whatever shape or form. A narrow strip 2 is disposed centrally of and vertically across the face of the lens. A recess 3 is formed in the lens for the reception of strip 2, and at the back of said recess may be formed a bead 4 which reinforces the lens and compensates for the recess 3, which may have a tendency to weaken the glass at that point. This bead 4 also serves as a cylindrical lens which magnifies the narrow strip of reflective material and causes it to appear larger than it actually is. Thus while the strip may be so narrow as not to interfere in any way with the projection of light, it will at the same time be clearly visible by reason of the magnifying effect of the bead 4.

Strip 2 is preferably made of metal having a cross section in which the thickness is small compared with the width. It is preferably formed with a surface of chrome, nickel, or alloy plate which takes on a high degree of polish and resists tarnish and corrosion. The strip is adapted in the illustration shown in Fig. 1 to have a reinforcing effect on the glass lens. In the form of the invention as described and as shown in Fig. 1, where the lens is formed of a single metallic strip disposed vertically and centrally thereof, the effect is highly ornamental, since sunlight will be reflected from the lens and will give a very pleasing appearance to the lens. This effect blends harmoniously with the effect created by the plate and highly polished surfaces of the other portions of the automobile.

Although the drawing shows lenses provided with a single narrow reflecting surface, it is within the scope of the invention to provide several such strips in lieu of a single strip.

For example, strips may be placed on either side of the central strip shown in Fig. 1 and symmetrically disposed relative to each other and to the central strip. On the other hand, the central strip may be eliminated and strips may be placed on either side of the central vertical axis of the lens, symmetrically disposed relative to each other and to such central axis.

Various ways of disposing such ornamental strips may be conceived of after understanding the nature of the invention.

It is proposed in the preferred form that the strips will comprise a metal having a highly polished flat outer surface. In lieu of such material, the strip may comprise an alloy of chromium, nickel, or other metal having the inherent property of acquiring a high polish without plating.

A further modification of the invention is shown in Fig. 3 of the drawing. In this figure in place of the polished metal strip 2, there may be molded or otherwise formed and inserted into a lens 6 a metallic wire or rod 5 having its outer surface highly polished or plated with a metal having a high reflective power. The polish of element 5 causes a reflection of any rays passing through the glass in the lens 6 immediately in front of element 5 so as to give the same artistic effect created by the form of the invention shown in Figs. 1 and 2.

Fig. 4 illustrates a form of the invention in which the reflecting strip or strips comprise a silvered or mirror surface formed by applying to the lens a coating composition which forms a mirror surface having a high reflecting intensity. In this form a groove 7 is formed in a lens 8, and within the groove is disposed a highly reflective coating 9. The design of the strip may of course vary considerably in design.

The particular form and shape of metallic strip 2 may vary to any desired degree. The strips may have formed integrally therewith a trade-mark or other distinguishing mark, such as the name of the manufacturer, which mark may be likewise provided with a highly polished surface. If desired, a portion of the strip may be formed as a circle within which is inscribed an identifying mark for the purpose of advertising or for some similar reason. It will be seen, therefore, that the invention is capable of many variations, all of which are to be included within the purview of the invention.

Having thus described my invention, what I claim is:

1. A transparent closure for an automobile lamp having a vertical axial portion thereof provided with a highly reflective surface and having a cylindrical lens formation on the side opposite said reflective surface to cause said reflective surface to appear larger than it actually is when viewed from a position in front of the lamp.

2. A transparent closure for an automobile lamp having a recess therein, an elongated metallic member having a highly reflective convex surface in said recess, the convex reflective surface being against the inner surface of the recess, the surface of the closure opposite said recess being formed as a lens to magnify said reflective surface.

3. A transparent closure for an automobile lamp having a diametrical recess therein, a relatively narrow metallic strip embedded in said recess, the surface of said strip visible through said closure being highly reflective, and a cylindrical lens formed on said closure opposite said recess to magnify the reflective surface of said metallic strip.

4. A lens adapted for use in automobile lights comprising, a lens body and a metallic strip disposed centrally and vertically across the body and adapted to present a highly reflective surface when viewed from the front of the lens, and a cylindrical bead formed on the opposite side of said lens from said strip and overlying said strip to magnify the same when viewed from the front of the lens.

5. A lens adapted for use in automobile lights comprising, a lens body provided with a diametrical recess, a narrow opaque reinforcing member mounted in said recess, and a cylindrical bead overlying said reinforcing member on the side of said lens opposite said recess, whereby the reinforcing member may be sufficiently narrow as not to obstruct light projected through said lens and at the same time will be so magnified as to be clearly visible when viewed from a position in front of said lens.

6. A lens adapted for use in automobile lights comprising, a lens body provided with vertical light refracting flutes, a recess extending centrally across said lens parallel with said flutes, and a metallic member mounted in said recess and having a highly reflective surface visible through said lens, the width of said metallic member being substantially the same as the width of said flutes.

7. A transparent elliptical closure for an automobile lamp having flutes parallel to the major axis of the ellipse in one side thereof, a groove in the fluted side of said closure substantially coincident with the major axis thereof, and an element having a highly reflective surface positioned in said groove with the reflective surface of the element in contact with the surface of the closure.

8. A transparent elliptical closure for an automobile lamp having flutes parallel to the major axis of the ellipse in one side thereof, a groove in the fluted side of said closure substantially coincident with the major axis of the ellipse, an element having a highly reflective surface positioned in said groove with the reflective surface of the element in contact with the surface of the closure, and a cylindrical prismatic lens formed on the opposite side of the closure from said groove overlying said groove.

Signed by me at South Bend, Indiana this 13th day of November, 1930.

JAMES R. HUGHES.